US008092296B2

(12) United States Patent
Inoue

(10) Patent No.: US 8,092,296 B2
(45) **Date of Patent: *Jan. 10, 2012**

(54) SYMBOL DISPLAY DEVICE FOR GAME MACHINE

(75) Inventor: Haruo Inoue, Tokyo (JP)

(73) Assignee: IGT, Reno, NV (US)

(*) Notice: Subject to any disclaimer, the term of this patent is extended or adjusted under 35 U.S.C. 154(b) by 876 days.

This patent is subject to a terminal disclaimer.

(21) Appl. No.: 12/118,139

(22) Filed: May 9, 2008

(65) Prior Publication Data

US 2008/0214282 A1 Sep. 4, 2008

Related U.S. Application Data

(63) Continuation of application No. 10/935,195, filed on Sep. 8, 2004, now Pat. No. 7,371,172.

(51) Int. Cl.
*A63F 13/00* (2006.01)
*G07F 17/34* (2006.01)

(52) U.S. Cl. ................ 463/20; 463/16; 463/22; 463/30; 463/31; 463/32; 273/141; 273/142; 273/143; 273/138.1; 273/138.2

(58) Field of Classification Search ........................ None
See application file for complete search history.

(56) References Cited

U.S. PATENT DOCUMENTS

| | | | | |
|---|---|---|---|---|
| 1,970,586 | A | 8/1934 | Wahlberg | |
| 3,136,550 | A | 6/1964 | Ruderian | |
| 4,844,467 | A | 7/1989 | Gyenge et al. | |
| 5,152,529 | A * | 10/1992 | Okada | 463/20 |
| 5,209,477 | A | 5/1993 | Heidel et al. | |
| 5,395,111 | A | 3/1995 | Inoue | |
| 5,462,277 | A | 10/1995 | Takemoto | |
| 5,584,764 | A | 12/1996 | Inoue | |
| 5,609,524 | A | 3/1997 | Inoue | |
| 5,722,891 | A | 3/1998 | Inoue | |
| 5,752,881 | A | 5/1998 | Inoue | |
| 5,863,249 | A | 1/1999 | Inoue | |
| 5,984,782 | A | 11/1999 | Inoue | |
| 6,059,658 | A | 5/2000 | Mangano et al. | |
| 6,105,962 | A | 8/2000 | Malavazos et al. | |
| 6,224,483 | B1 | 5/2001 | Mayeroff | |
| 6,315,663 | B1 | 11/2001 | Sakamoto | |
| 6,336,863 | B1 | 1/2002 | Baerlocher et al. | |

(Continued)

FOREIGN PATENT DOCUMENTS

EP 1 003 138 5/2000

(Continued)

*Primary Examiner* — David L Lewis
*Assistant Examiner* — Christine Liao
(74) *Attorney, Agent, or Firm* — K&L Gates LLP

(57) ABSTRACT

A slot machine includes a reel assembly which has a transparent outer reel and a translucent inner reel disposed coaxially within the outer reel. The outer and inner reels are provided with first exterior surfaces on their periphery, and with second exterior surfaces on their side surfaces. The outer and inner reels are driven independently by a respective motor. In performing a first game, the side surfaces are horizontal so that first outer symbols and first inner symbols carried on each of the first exterior surfaces may be observable. In performing a second game, the side surfaces are perpendicular so that second outer symbols and second inner symbols carried on each of the second exterior surfaces may be observable. Symbol combinations are produced by synthesizing the symbols on the outer reel and the symbols on the inner reel.

30 Claims, 15 Drawing Sheets

U.S. PATENT DOCUMENTS

| | | | | |
|---|---|---|---|---|
| 6,398,220 | B1 | 6/2002 | Inoue | |
| 6,446,965 | B1 | 9/2002 | Boulton | |
| 6,558,253 | B1 | 5/2003 | DeSimone et al. | |
| 6,598,877 | B1 | 7/2003 | Luciano et al. | |
| 6,605,000 | B2 | 8/2003 | Adams | |
| 6,612,575 | B1 | 9/2003 | Cole et al. | |
| 6,623,006 | B2 | 9/2003 | Weiss | |
| D487,582 | S | 3/2004 | McGahn et al. | |
| 6,705,944 | B2 | 3/2004 | Luciano | |
| 6,715,756 | B2 | 4/2004 | Inoue | |
| D496,968 | S | 10/2004 | Baerlocher | |
| 6,827,646 | B2 | 12/2004 | Adams | |
| 6,855,056 | B2 | 2/2005 | Inoue | |
| 6,923,441 | B2 | 8/2005 | Inoue | |
| 6,974,129 | B2 | 12/2005 | Nordman | |
| 6,988,731 | B2 | 1/2006 | Inoue | |
| 6,998,805 | B2 | 2/2006 | Nireki et al. | |
| 7,053,585 | B2 | 5/2006 | Nireki | |
| 7,331,858 | B2 * | 2/2008 | McComb et al. | 463/16 |
| 2002/0094862 | A1 | 7/2002 | Inoue | |
| 2002/0142829 | A1 | 10/2002 | Inoue | |
| 2003/0027628 | A1 | 2/2003 | Luciano | |
| 2003/0148804 | A1 | 8/2003 | Ikeya et al. | |
| 2003/0153385 | A1 | 8/2003 | Ikeya et al. | |
| 2003/0232643 | A1 | 12/2003 | Inoue | |
| 2004/0000754 | A1 | 1/2004 | Inoue | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0017041 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048645 | A1 | 3/2004 | Webb et al. | |
| 2004/0150161 | A1 | 8/2004 | Inoue | |
| 2004/0155399 | A1 | 8/2004 | Inoue | |
| 2004/0162133 | A1 | 8/2004 | Jackson | |
| 2004/0183251 | A1 | 9/2004 | Inoue | |
| 2004/0256799 | A1 | 12/2004 | Omomo | |
| 2005/0026678 | A1 | 2/2005 | Kaminkow | |
| 2005/0043081 | A1 | 2/2005 | Baerlocher | |
| 2005/0056996 | A1 | 3/2005 | Nordman | |
| 2005/0059477 | A1 * | 3/2005 | Baerlocher | 463/20 |
| 2005/0059478 | A1 | 3/2005 | Peterson et al. | |
| 2005/0104288 | A1 | 5/2005 | Omomo | |
| 2006/0019738 | A1 | 1/2006 | Baerlocher et al. | |
| 2006/0046830 | A1 | 3/2006 | Webb | |
| 2006/0052152 | A1 | 3/2006 | Tedsen et al. | |
| 2006/0052155 | A1 | 3/2006 | Inoue | |

FOREIGN PATENT DOCUMENTS

| | | |
|---|---|---|
| GB | 2 165 074 | 4/1986 |

* cited by examiner

SYMBOL DISPLAY DEVICE FOR GAME MACHINE

PRIORITY CLAIM

This application is a continuation application of, claims priority to and the benefit of U.S. patent application Ser. No. 10/935,195 filed on Sep. 8, 2004, the entire contents of which is incorporated herein.

BACKGROUND

The present invention relates to a symbol display device for a game machine that includes plural symbol display members used for performing plural games.

In a slot machine, there are a reel type and a video type. In the reel type slot machine, plural rotatable reels are disposed side by side, and each of the reels carries plural symbols. In the video type, the slot machine simulates the movement of the reel and displays it on a display, such as a CRT and the like. In order to perform the slot game with the slot machine, a coin (including a medal and a token) is inserted, and thereafter the start lever is operated. When the start lever is operated, the symbol arrays start moving. In the slot machine having a stop button, when the stop button is operated, each of the symbol arrays stop moving. Further, in the slot machine of the automatic-stop type, after a random time passes, each of the symbol arrays stops moving. Thus on each winning line the plural symbols construct a symbol combination. When the symbol combination is the same as that for winning, a player wins the game and obtains a predetermined prize.

A slot machine including another symbol display device for performing a subsidiary game is also known as the symbol display device for the slot game that is mentioned above. In this slot machine, when the player wins the slot game, a dividend determining game is performed as the subsidiary game for determining a number of dividend coins to be discharged. The symbol display device for the subsidiary game is rotatably provided with a disk-like display member, on which several numbers are recorded. In the dividend determining game, when the display member stops after rotation for a predetermined time, the number corresponding to an index is determined as a number of the dividend coins. Further, when the symbol display device for the subsidiary game is disposed in the upper side of the slot machine, the contents of the game are easily known to other players.

As the symbol display device for performing the subsidiary game, U.S. Pat. No. 6,715,756 discloses a symbol display device including a display member rotated by a rotation drive means and a shift means for shifting the display member between a first position and a second position. The display member has a first display portion carrying symbols for the dividend determining game and a second display portion carrying symbols for a double-up game. The double-up game is performed automatically or optionally when the player wins the slot game in a predetermined condition. In the double-up game, the number on the display member pointed by a pointer after stop of rotation is determined as a multiplier to the number of the dividend coins. When the display member is in the first position, the first display portion is observable so as to perform the dividend determining game. When the display member is in the second position, the second display portion is observable so as to perform the double-up game. According to the display device, as the display member is shifted between the first and second display positions, the plural games can be independently performed even by using one display member, and variations of the game become more. Further, as the display member shifts, the symbol display device can become more attractive.

In addition, U.S. Pat. No. 5,395,111 discloses a slot machine including a transparent outer reel on which a plurality of symbols are arranged, and an inner reel disposed within the outer reel such that a plurality of symbols arranged on the inner reel are seen from the transparent outer reel.

According to the slot machine, a greatly increased number of symbols can be formed without using a reel having a large diameter. Further, by independently rotating the inner and outer reels, the combined display of the two reels provides a novel game sense. Still further, by stopping the reels at different times, interest in the game is increased.

However, in the U.S. Pat. No. 6,715,756, the number of symbols on each display portion is limited by the small space of each display portions. Therefore, variations of symbol displaying are few.

In addition, in the U.S. Pat. No. 5,395,111, the symbols are arranged only circumference frame of each reel. Therefore, the plural games can not be independently performed by using one display member. Further, since each reel is only rotating in the one predetermined direction, they can not make a great visual impact on the player.

SUMMARY

An object of the present invention is to provide a symbol display device performing various symbol displays by using one display member.

Another object of the present invention is to provide a symbol display device that can make a great visual impact on the player.

In order to achieve the above and other objects, a symbol display device of the present invention includes a rotatable reel assembly consisting of an outer reel and an inner reel disposed within the outer reel, a shift means for shifting the reel assembly between a first position for performing a first game and a second position for performing a second game, and a rotation drive means for rotating and stopping the outer reel and the inner reel individually in performing the first game and the second game. Each of the outer and inner reels comprises a first exterior surface and a second exterior surface. Each of the first exterior surfaces carries first outer symbols and first inner symbols, and each of the second exterior surfaces carries second outer symbols and second inner symbols. The first outer symbols and the first inner symbols are observable when the reel assembly is in the first position, and the second outer symbols and the second inner symbols are observable when the reel assembly is in said second position.

In the preferable embodiment of the present invention, the inner reel is disposed coaxially within the outer reel. The outer reel is driven by a driving shaft, and the inner reel is driven by a driving pipe. The driving shaft is inserted in the driving pipe.

According to the invention, the reel assembly having the outer reel and the inner reel composes a display member which shifts between the first position and the second position. Therefore, the plural games can be independently performed even by using the one display member, various combined symbols of the two reels can be formed, and variations of the game become more. Further, as the display member shifts with the inner and outer reels rotating independently, the symbol display device can become more attractive.

Additional features and advantages are described herein, and will be apparent from the following Detailed Description and the figures.

BRIEF DESCRIPTION OF THE FIGURES

The above objects and advantages of the present invention will become easily understood by one of ordinary skill in the art when the following detailed description would be read in connection with the accompanying drawings.

DETAILED DESCRIPTION

Figure 1:
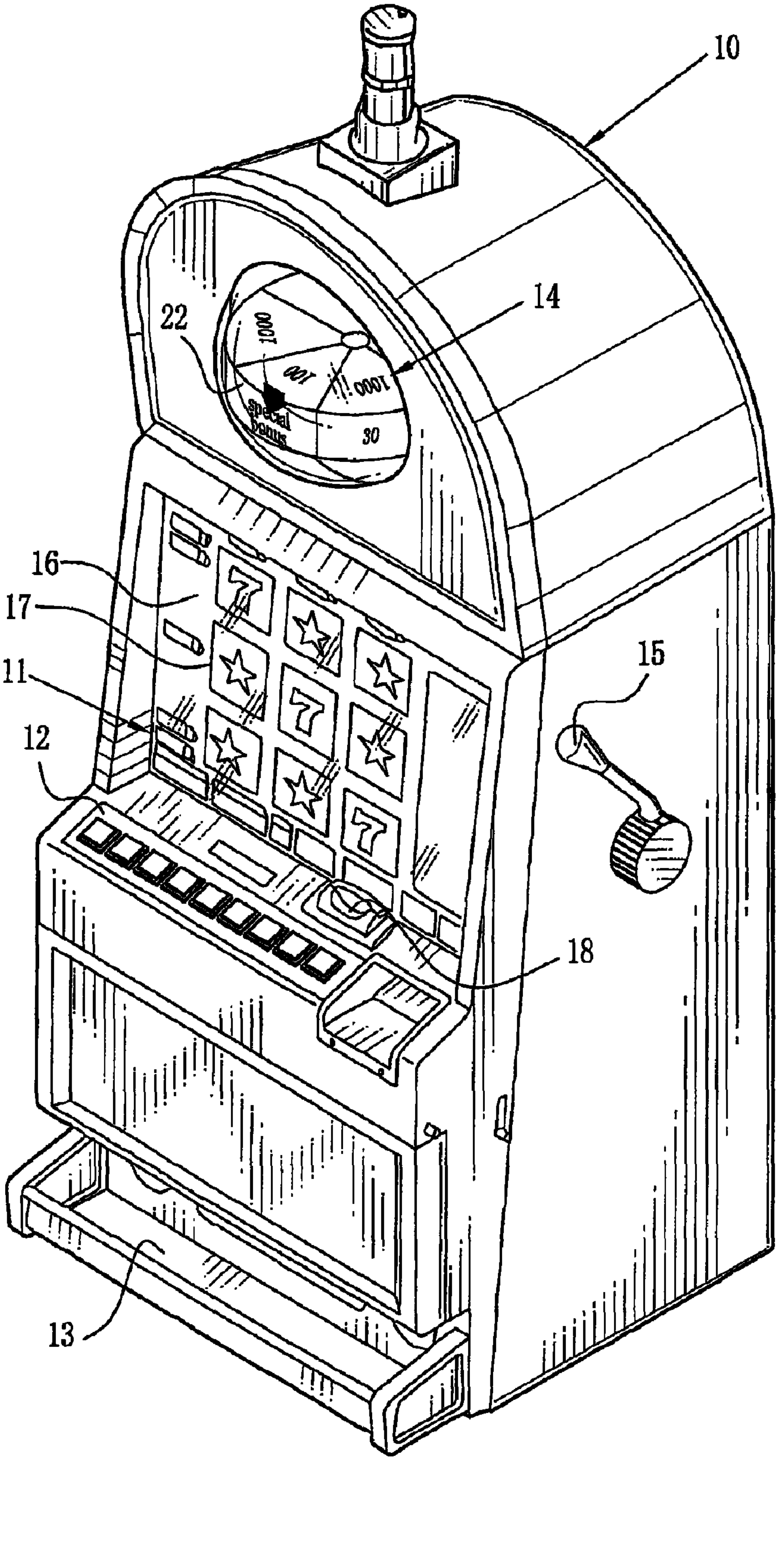
FIG. 1 is a perspective view of a slot machine including a symbol display device of the present invention, wherein reels are set to a first position.

In FIG. 1, a front face of a slot machine is provided with a first symbol display device 11, an operation panel 12, a coin receiver 13 and a second symbol display device 14. The first symbol display device 11 is used for a slot game, which is a main game, and the second symbol display device 14 is used for subsidiary games. As the subsidiary games there are a first subsidiary game and a second subsidiary game.

The first symbol display device 11 includes a LCD panel 16. The LCD panel 16 is provided with nine symbol display windows 17. Three of the symbol display windows are arranged in both of vertical and horizontal directions on the LCD panel 16 respectively. In the symbol display windows 17 several symbol images are displayed independently. The symbol is, for example, number, letter, sign, design, character, illustration, picture and the like.

A side of the slot machine 10 is provided with a start lever 15. When the start lever 15 is operated, the symbol images are displayed so as to be continuously moving in the same direction in each of the symbol display windows 17. Further, there are eight judgment lines in combination of three of the symbol display windows 17. Namely, three judgment lines are predetermined in vertical and horizontal directions respectively, and two judgment lines are predetermined in a diagonal direction.

For performing the slot game, each of the judgment lines is activated by betting a coin (not shown). In order to bet the coin, the coin is inserted through a coin slot 18, and a bet button provided in the operation panel 12 is depressed. Note that in the operation panel 12 there are also a pay out button and a subsidiary game start button. When the symbol combination for winning is completed on the activated judgment lines, the player wins the slot game and obtains dividend coins whose dividend number is fixed in accordance with a grade of the winning.

When a predetermined symbol combination is completed on the activated judgment lines, the second symbol display device 14 is automatically actuated such that the player can perform the dividend determining game. In the dividend determining game including the first subsidiary game and the second subsidiary game, a reel assembly 22 of the second symbol display device 14 is set to a first position as shown in FIG. 1.

Figure 2:
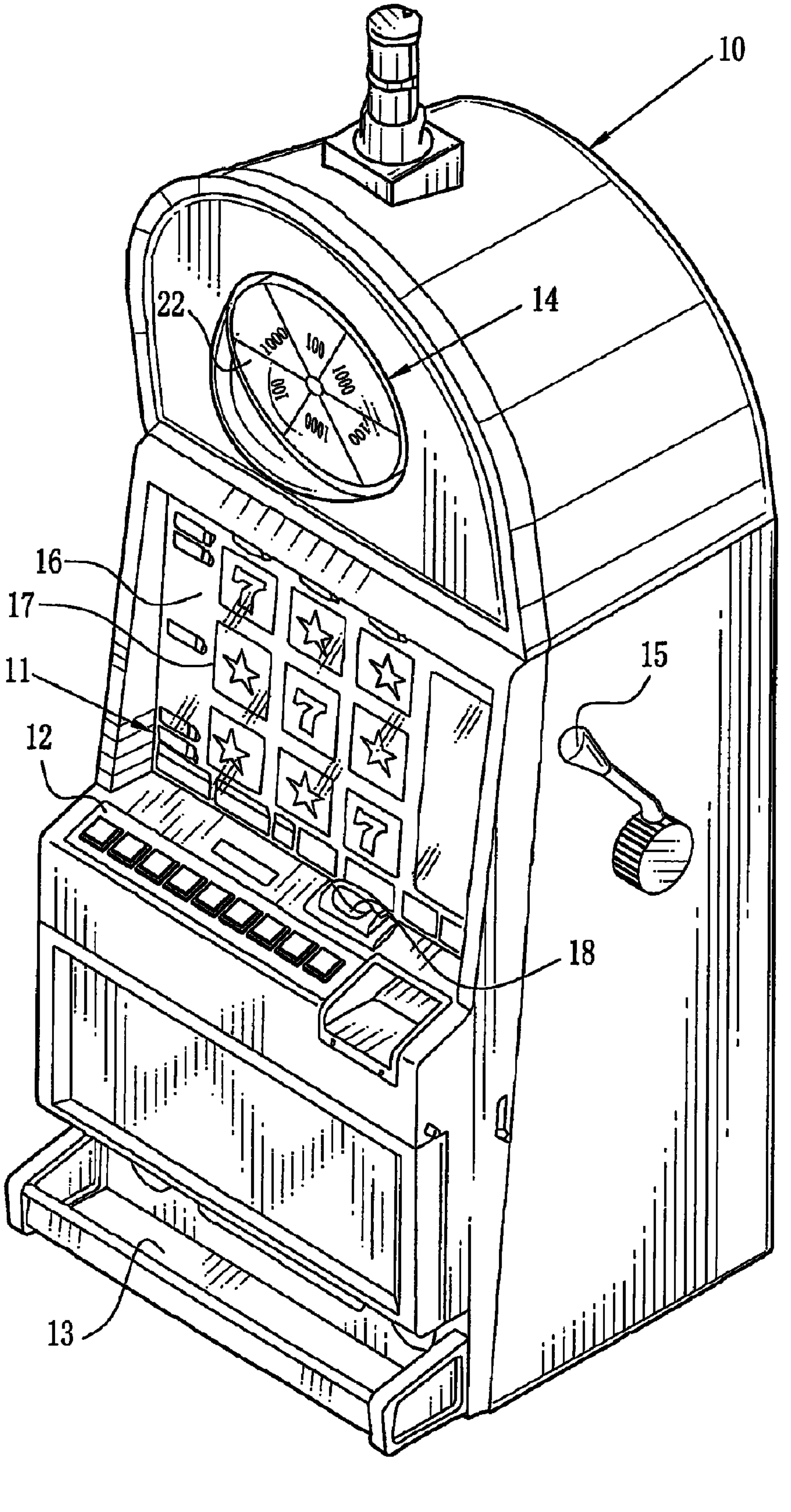
FIG. 2 is a figure similar to FIG. 1, wherein the reels are set to a second position.

In case of displaying symbols for execution of the second subsidiary game, the second subsidiary game is performed. When the second subsidiary game is performed, the reel assembly 22 is rotated by 90° by the operation of the second symbol device 14 and set to a second position as shown in FIG. 2.

Figure 3:
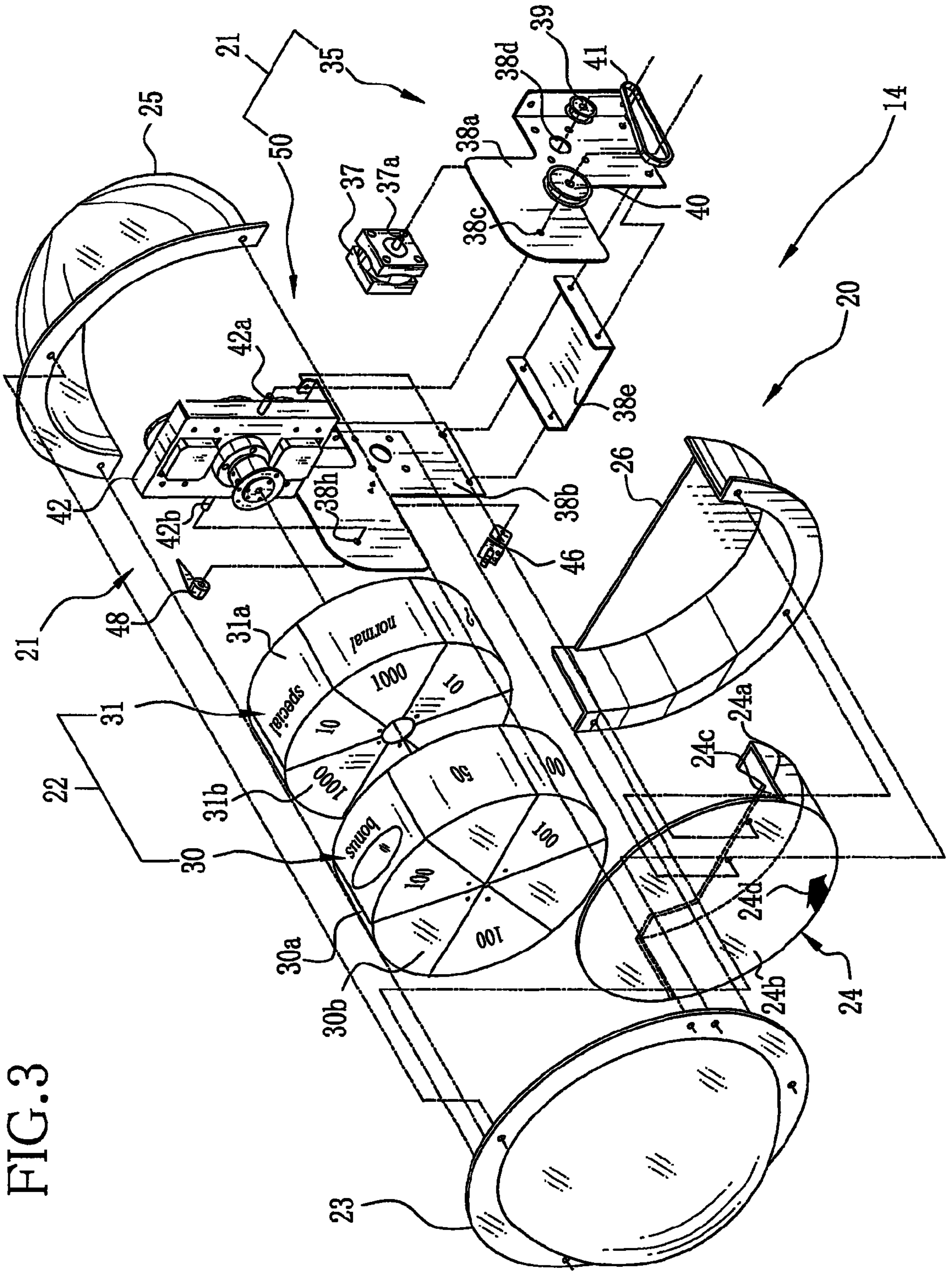
FIG. 3 is an explanatory perspective view of the symbol display device.

As shown in FIG. 3, the second symbol display device 14 includes a display section 20 and a reel drive section 21. The display section 20 is constructed of the reel assembly 22, a hemispherical front cover 23, a reel cover 24, a quarter-spherical upper-rear cover 25 and a lower-rear cover 26.

The front cover 23, the upper- and lower-rear covers 25, 26 are fixed on an inside of the slot machine 10 with screws 10*a* (See, FIGS. 6 and 7) so as to surround the reel assembly 22 and the reel cover 24. The front cover 23 is formed of a transparent resin. A spherical part of the front cover 23 protrudes out after attachment to the slot machine 10. On the upper- and lower-rear covers 25, 26, some images are printed such that the inside of the slot machine 10 cannot be seen by the player while the reel assembly 22 is set in the first position.

The reel assembly 22 consists of an outer reel 30 and an inner reel 31. The outer reel 30 and the inner reel 31 are cylinders whose cross sections are channel-shaped. The outer reel 30 is formed of a transparent resin, wherein a periphery surface thereof is a first exterior surface 30*a* and a side surface thereof is a second exterior surface 30*b*. The inner reel 31 is formed of a translucent resin, wherein a periphery surface thereof is a first exterior surface 31*a* and a side surface thereof is a second exterior surface 31*b*. The first exterior surfaces 30*a* and 31*a* are used for the first subsidiary game, and the second exterior surfaces 30*b* and 31*b* are used for the second subsidiary game. On the first and second exterior surfaces 30*a*, 30*b*, 31*a* and 31*b*, plural symbols are printed for determining the dividend number. Note that the symbols may be sign, pattern, character and the like. Further, about the outer reel 30, what is necessary is to constitute the outer reel 30 so that the symbols on the inner reel 31 may be observed through the outer reel 30. Therefore, for example the outer reel 30 may be formed by opaque or translucent resin, and a transparent portion, through which the symbols on the inner reel 31 is observed, may be prepared on some parts of the outer reel 30.

The reel cover 24 is constructed of a first display surface 24*a*, a second display surface 24*b* and a reel pocket 24*c*. Note that, about the reel cover 24, what is necessary is to constitute the reel cover 24 so that the symbols on the outer and inner reels 30, 31 may be observed through the reel cover 24. Therefore, for example the reel cover 24 may be formed by opaque resin, and a transparent portion, through which the symbols on the outer and inner reels 30, 31 are observed, may be prepared on some parts of the reel cover 24. In this construction, internal parts of the slot machine 10 can be prevented from being observed through the reel cover 24. The reel pocket 24*c* has a diameter slightly longer than the reel assembly 22, for holding the reel assembly 22 therein. When the reel pocket 24*c* houses the reel assembly 22, the first and the second display surface 24*a*, 24*b* confront to the first exterior surface 30*a* of the outer reel 30 and the first inner surface 30*b* of the outer reel 30, respectively. The first display surface 24*a* has a pointer 24*d* at its border. The pointer 24*d* points one of the symbols on the first outer and inner surfaces 30*a*, 31*a* of the outer and inner reels 30, 31.

The reel drive section 21 comprises a reel shift drive section 35 and a reel rotation drive section 50. The reel shift drive section 35 is constructed of a shift motor 37, a right bracket 38*a*, a left bracket 38*b*, a small pulley 39, a large pulley 40, a toothed belt 41, a unit support plate 42, a sensor 46 for the unit support plate 42, and a fragment 48.

Figure 6:
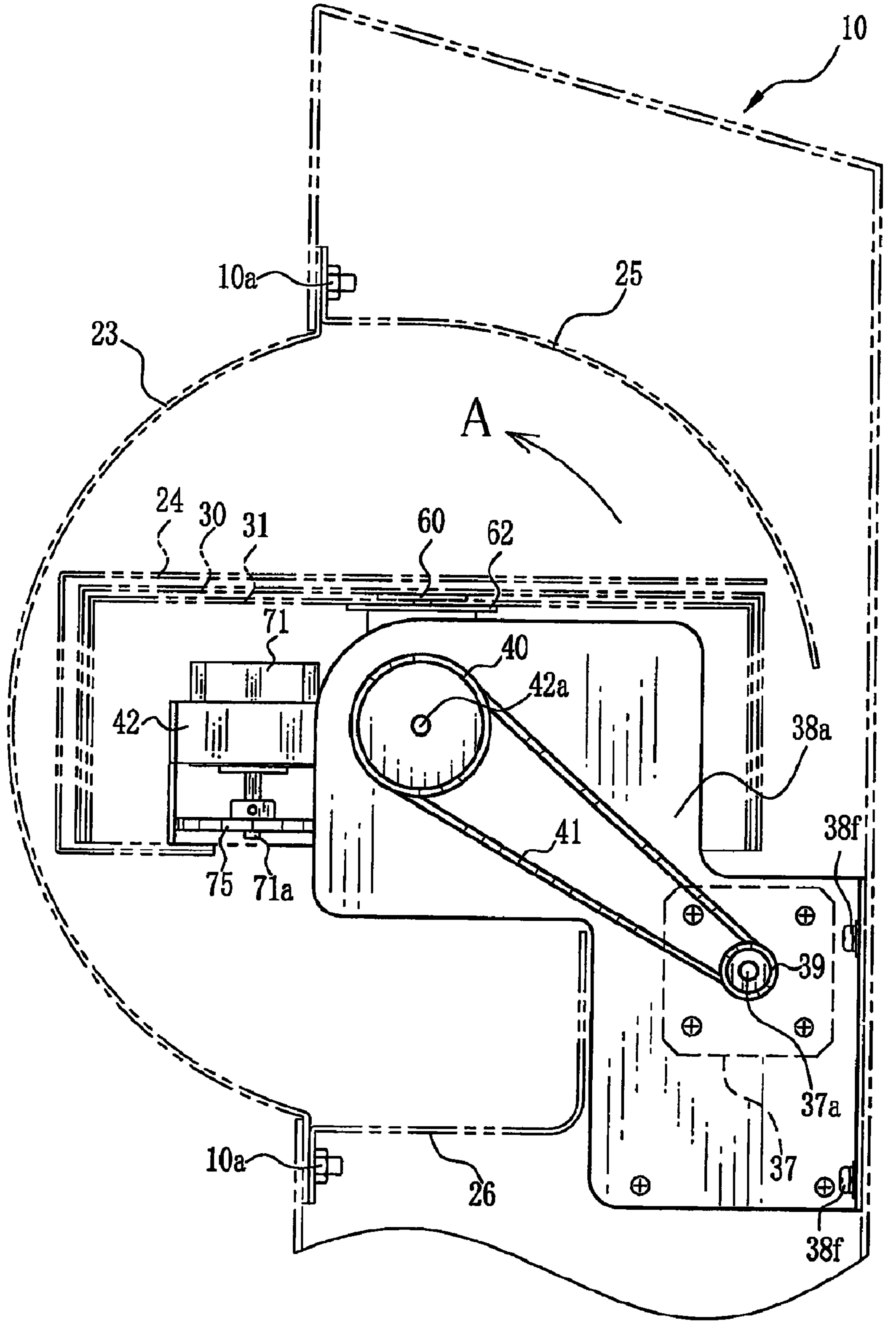
FIG. 6 is a side view of a bracket, wherein the reels are set to the first position.
Figure 7:
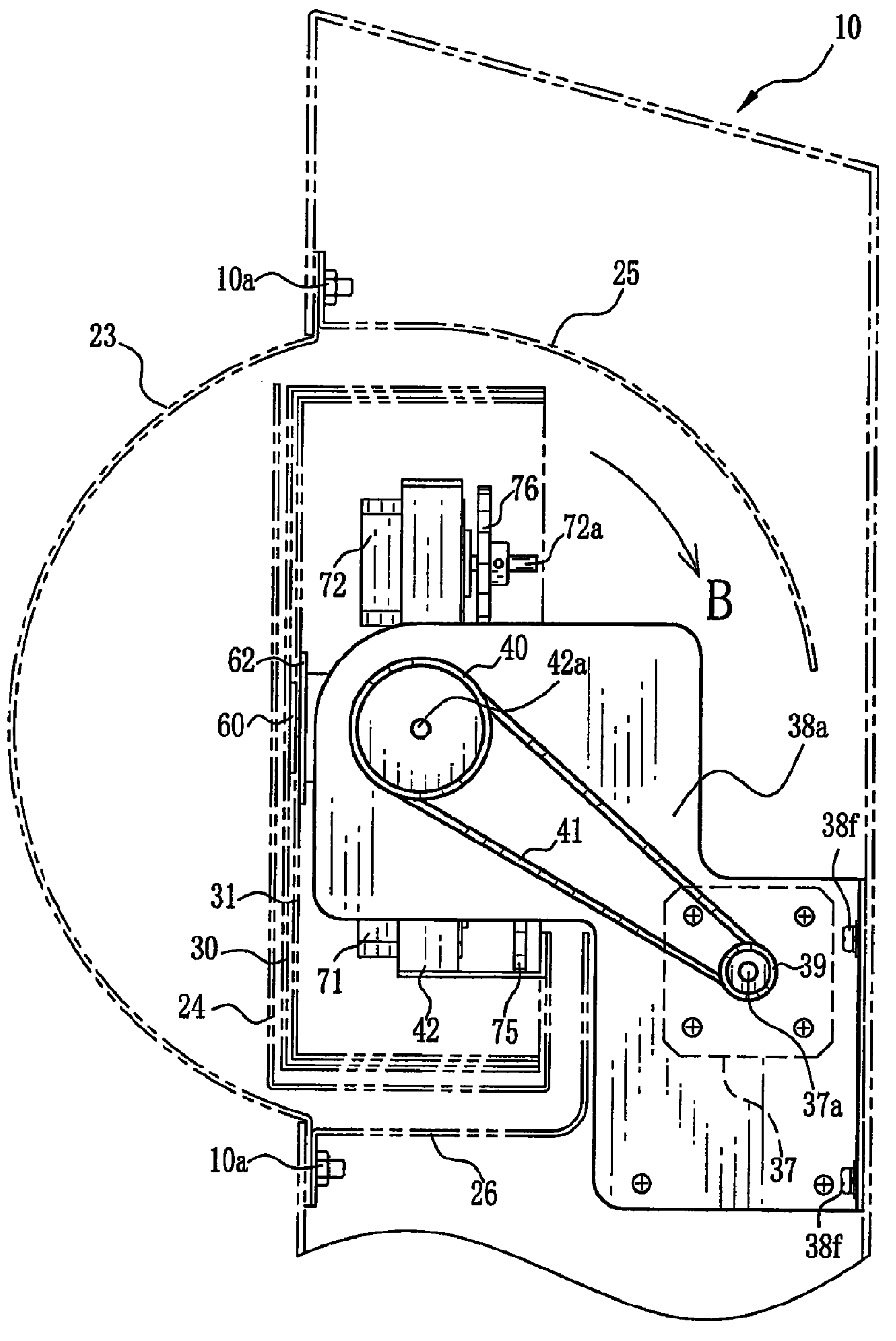
FIG. 7 is a figure similar to FIG. 6, wherein the reels are set to the second position.

The right and left brackets 38*a*, 38*b* are fixed to a base 38*e* with screws (not shown), and fixed to the slot machine 10 with screws 38*f* (see, FIGS. 6 and 7). In the right bracket 38*a* a hole 38*c* is formed. In the hole 38*c* a shaft 42*a* provided on the unit support plate 42 is inserted to be rotatable. In the left bracket 38*b* a hole 38*h* is formed. In the hole 38*h* a shaft 42*b* provided on the unit support plate 42 is inserted to be rotatable.

The shift motor 37 is a stepping motor and attached to the right bracket 38*a* with screws (not shown). In the right bracket 38*a*, an opening 38*d* is formed, and through the opening 38*d* a drive shaft 37*a* of the shift motor 37 is inserted. To the drive shaft 37*a* it is attached the small pulley 39 which is connected through the toothed belt 41 with the large pulley 40. The large pulley 40 is firmly attached to the shaft 42*a*, which is inserted through the hole 38*c* of the right bracket 38*a*. Further, the fragment 48 is firmly attached to the shaft 42*b*, which is inserted through the hole 38*h* of the left bracket 38*b*. The sensor (photo interrupter) 46 for detecting the fragment 48 is attached to the left bracket 38*b* with screws (not shown). When the shift motor 37 drives, the unit support plate 42 and the fragment 48 swing in the directions A and B (see FIGS. 6 and 7) through the small pulley 39, the toothed belt 41, and the large pulley 40.

In accordance with the rotation of the unit support plate 42, the reel assembly 22 and the reel cover 24 that are fixed to the unit support plate 42 shift between the first position shown in FIG. 6 and the second position shown in FIG. 7. When the reel assembly 22 shifts between the first position and the second position, the fragment 48 rotates to be detected by the sensor 46.

Figure 4:
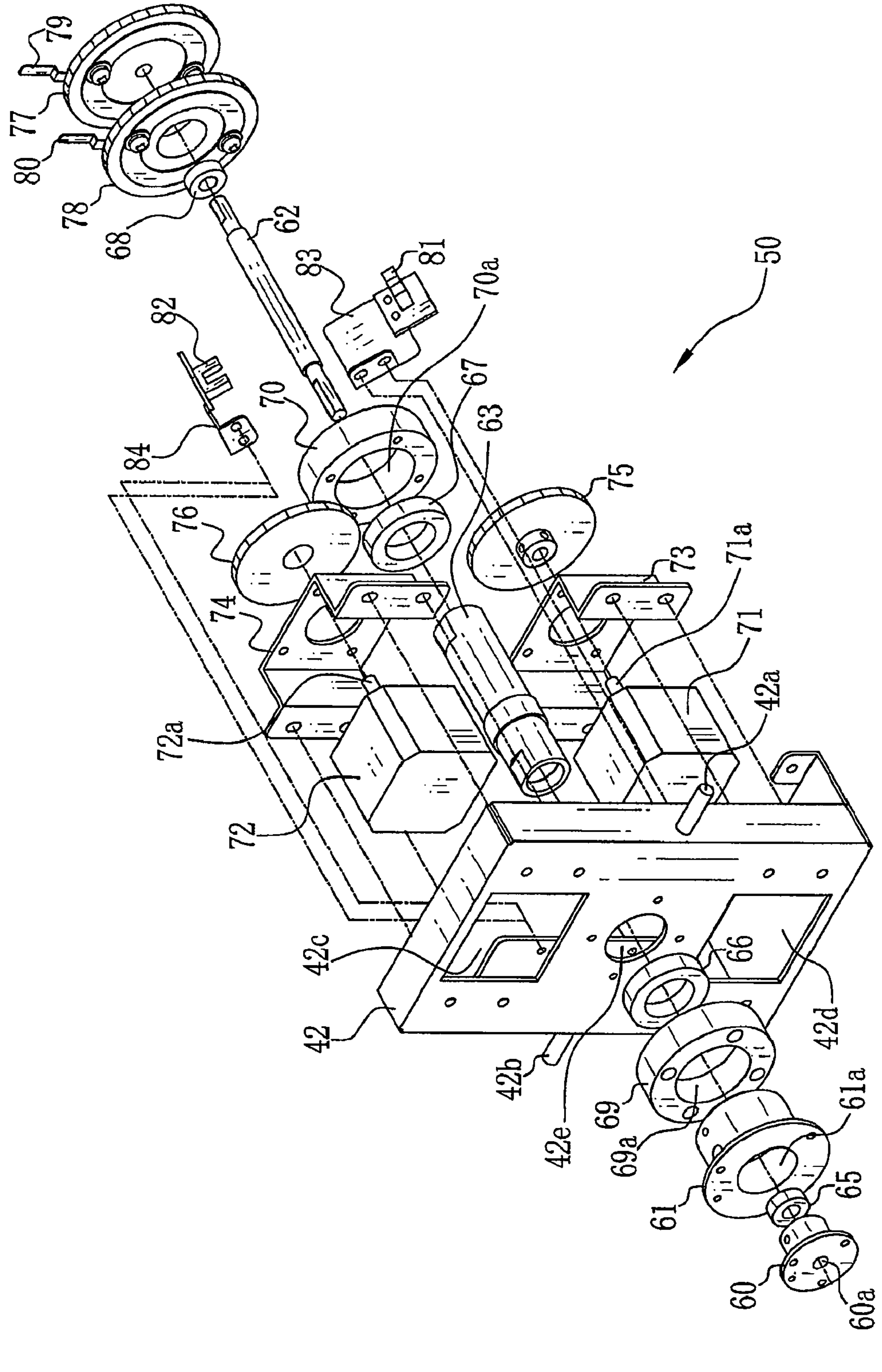
FIG. 4 is an exploded explanatory perspective view of a structure of a mechanism for holding and driving a driving shaft.
Figure 5:
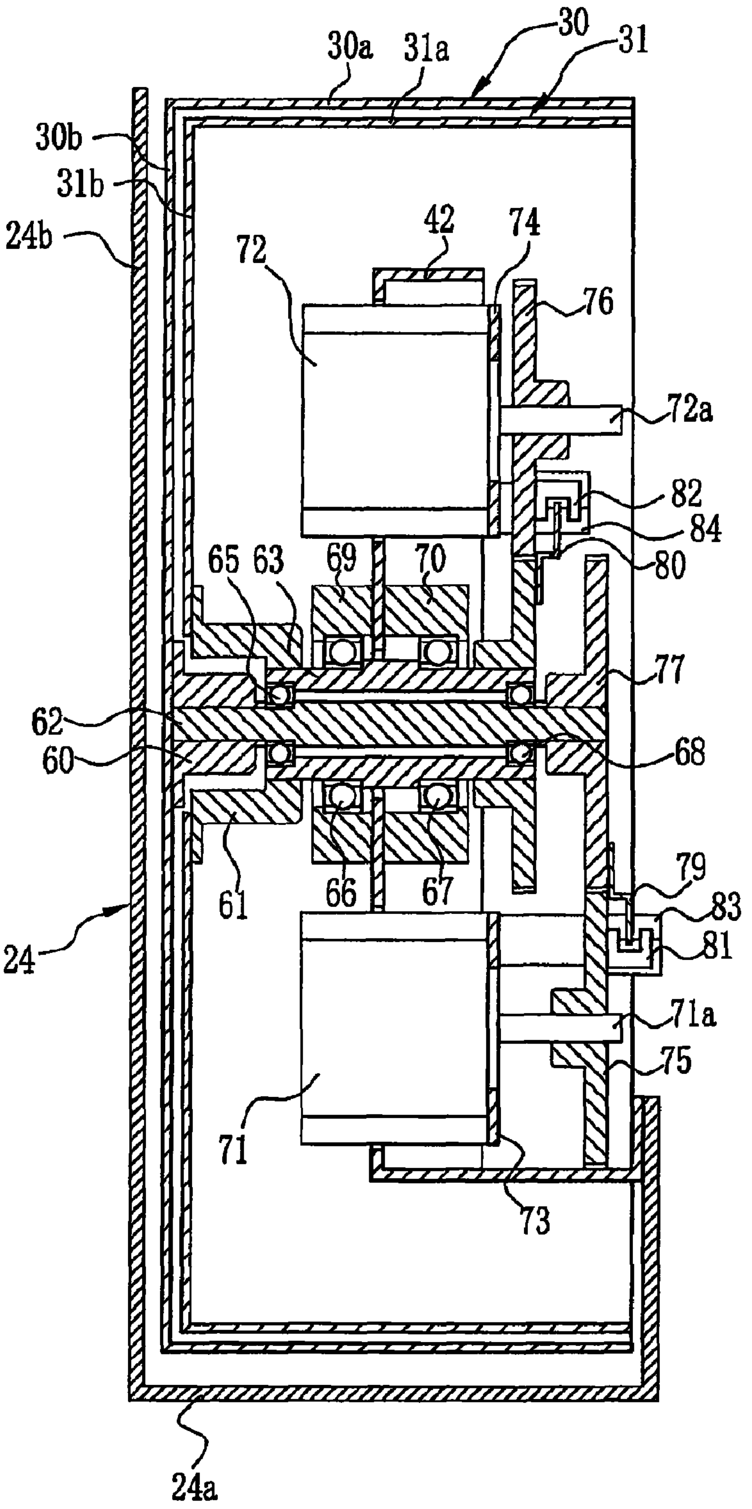
FIG. 5 is a cross-sectional view of main parts of the symbol display device.

As shown in FIGS. 4 and 5, the reel rotation drive section 50 is composed of a small size flange 60, a large size flange 61, a first rotary shaft 62, a second rotary shaft 63, bearings 65-68, bearing members 69 and 70, stepping motors 71 and 72, motor mounting brackets 73 and 74, drive gears 75 and 76, driven gears 77 and 78, a first signal segment 79, a second signal segment 80, an outer reel rotation detecting sensor 81, an inner reel rotation detecting sensor 82, and retaining members 83 and 84.

The small size flange 60 is fixed to the rear side of the outer reel 30 with screws (not shown). An opening 60*a* is formed on the small size flange 60, and one end of the first rotary shaft 62, through which the bearings 65 are inserted, is firmly fixed to the opening 60*a*. The large size flange 61 is fixed to the rear side of the inner reel 31 with screws (not shown). An opening 61*a* is formed on the large size flange 61, to contain the small size flange 60. And one end of the second rotary shaft 63, through which the bearings 66 are inserted, is firmly fixed to the opening 61*a*. The second rotary shaft 63 forms a tubular shape and the first rotary shaft 62 is inserted therein.

The first rotary shaft 62 is provided for rotating the outer reel 30. After being inserted into the second rotary shaft 63, one end of the first rotary shaft 62 (the end which is fixed to the small size flange 60) is inserted into the bearing 65. And the other end of the first rotary shaft 62 is inserted into the bearing 068, and is fixed to the driven gear 77.

The second rotary shaft 63 is a driving pipe, and the bearings 65 and 68, which are bearing members for the first rotary shaft 62, are fixed to shaft holes at both ends of the second rotary shaft 63. The large size flange 61, as described above, and the driven gear 78 are fixed to one end of the second rotary shaft 43 and the other end thereof respectively. Note that the first driving shaft 62 may be a driving pipe for the purpose of reducing its weight.

The bearings 65 and 68 function as bearing members for the first rotary shaft 62 and, at the same time, support the first rotary shaft 62 so that the first rotary shaft 62 and the second rotary shaft 63 are concentrically rotated.

The bearing members 69 and 70 have openings 69*a* and 70*a*, where the second rotary shaft 63 is inserted into, and bearings 66 and 67 are provided in the bearing members 69 and 70 so as to hold the second rotary shaft 63 rotatably. The bearing members 69 and 70 are fixed to the unit support plate 42 with screws (not shown) respectively. An opening 42*e* is formed in the unit support plate 42, in which the second rotary shaft 63 is inserted.

The stepping motors 71 and 72 are fixed to the motor mounting brackets 73 and 74 respectively. The brackets 73 and 74 are fixed to the unit support plate 42 with screws (not shown) respectively. The brackets 73 and 74 are fixed to the unit support plate 42 respectively in a state that the stepping motors 71 and 72 are inserted in openings 42*c* and 42*d* of the unit support plate 42 respectively. The drive gear 75 and the drive gear 76 are fixed to a driving shaft 71*a* of the stepping motor 71 and a driving shaft 72*a* of the stepping motor 72 respectively.

The first signal segment 79 is fixed to the driven gear 77 for indicating a reference position, and its rotation is observed by the outer reel rotation detecting sensor 81. On every turn of the outer reel 30, the outer reel rotation detecting sensor 81 outputs a reset signal. Note that the outer reel rotation detecting sensor 81 is fixed to the retaining member 83, which is fixed to the unit support plate 42.

The second signal segment 80 is fixed to the driven gear 78 for indicating a reference position, and its rotation is observed by the inner reel rotation detecting sensor 82. On every turn of the inner reel 31, the inner reel rotation detecting sensor 82 outputs a reset signal. Note that the inner reel rotation detecting sensor 82 is fixed to the retaining member 84, which is fixed to the unit support plate 42.

The drive gear 75 fixed to the driving shaft 71*a* of the stepping motor 71 meshes with the driven gear 77 fixed to the first rotary shaft 62. Thereby, driving force from the stepping motor 71 is transmitted to the first rotary shaft 62. The exterior diameter of the drive gear 75 is formed to be smaller than that of the driven gear 77. Consequently, the step rotation angle of the outer reel 30 becomes smaller than the unit step angle of the stepping motor 71, and that enables the outer reel 30 to rotate smoothly even when it rotates slowly.

Further, the drive gear 76 fixed to the driving shaft 72*a* of the stepping motor 72 meshes with the driven gear 78 fixed to the second rotary shaft 63. Thereby, driving force from the stepping motor 72 is transmitted to the second rotary shaft 63. The exterior diameter of the drive gear 76 is formed to be smaller than that of the driven gear 78. Consequently, the step rotation angle of the outer reel 31 becomes smaller than the unit step angle of the stepping motor 72, and that enables the inner reel 31 to rotate smoothly even when it rotates slowly.

Figure 8:
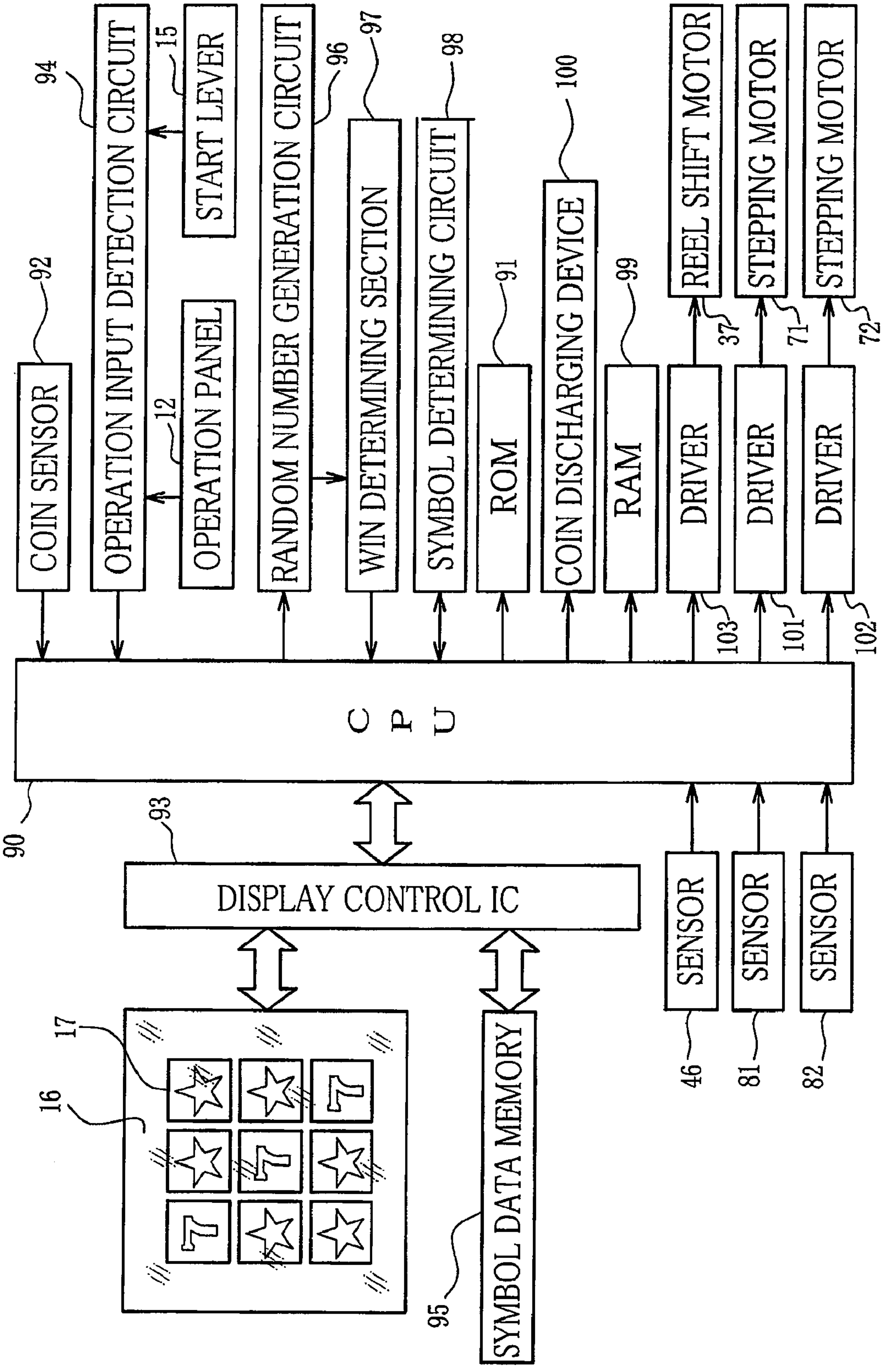
FIG. 8 is a block diagram of the slot machine.

As shown in FIG. 8, the drive of the slot machine 10 is controlled with a CPU 90. The CPU performs a game sequence based on a performing program for the slot game that is read out from a ROM 91. A coin sensor 92 is provided in an inner side of the coin slot 18, and generates a detection signal when detecting the insertion of a proper coin. The detection signal is inputted in the CPU 90. The CPU 90 actuates a display control IC 93 corresponding to the detection signal. The display control IC 93 makes a credit display window (not shown) on the liquid crystal display panel 16 displaying how many coins are inserted into the slot machine 10.

When each of the buttons of the operation panel 12 is depressed, an operation signal is sent from an operation input detection circuit 94 to the CPU 90. Further, when the start lever 15 is operated, a start signal is inputted to the CPU 90, and the CPU 90 drives the display control IC 93 corresponding to the start signal. The display control IC 93 reads out a graphic data of the symbol images from a symbol data memory 95 in accordance with each of the symbol display windows 17, and inputs the graphic data into the liquid crystal display panel 16 to simulate and display the moving of the symbol images.

Further, when the start signal is inputted into the CPU 90, one of the random numbers is sampled by a random number generating circuit 96. The random number is inputted into a win determining section 97. Then the win determining section 97 determines the loss or the kind of the winning of the slot game. A win determining signal or a loss determining signal is inputted into the CPU 90, in accordance with the kind of the winning or the loss.

The CPU 90 actuates a symbol determining circuit 98, responding to the win determining signal or the loss determining signal. The symbol determining circuit 98 determines the symbol image to be displayed in the respective symbol display window 17 in response to the loss or the kind of the winning determined by the win determining section 97 and inputs into the CPU 90 a determined first address corresponding to the determined symbol image.

The graphic data of each of the symbol display window 17 is inputted into the LCD panel 16 so as to display the moving of the symbol image. Thereby the display control IC 93 inputs into the CPU 90 a regulation first address assigned to each symbol image. By observing the regulation first address, the CPU 90 can discriminates what symbol image is displayed in each of the symbol display window 17. When the determined first address input from the symbol determining circuit 98 and the regulation first address input from the display control IC 93 are the same, the movement of the symbol images is stopped. In each of the symbol image window 17, the symbol image corresponding to the determined first address is displayed.

In order to minimize the differences in timing between inputting the determined first address of the graphic data into the LCD panel 16 and displaying the symbol image in correspond to the regulation first address in the symbol image window 17, the display control IC 93 observes the velocity of the moving of the symbol image in the symbol image window 17, based on a count number of the clock pulse.

When the player wins the slot game, the CPU 90 refers to a data of the dividend number recorded in the ROM 91 to specify the dividend number corresponding to the grade of the winning, stores in a RAM 99 a total of the dividend number and drives the display control IC 93 to display the total of the dividend number on the credit display window. When the pay out button on the operation panel 12 is depressed, a coin discharging device 100 discharges the specified dividend number of the dividend coins. Note that when the bet button for performing the next slot game is depressed before the pay out button is depressed, one of the judgment lines is activated each time without inserting the coin. In this case, the total of the dividend number decreased one by one.

The RAM 99 is used for temporarily storing several data generated in the process of the slot game, and has a memory area for recording the number of inserted coins. The RAM 99 further has a memory area for a credit counter which calculates the total number of the discharged dividend coins and the like.

When the first subsidiary game starts, the CPU 90 drives the stepping motor 71 through a driver 101, and after a predetermined time the stepping motor 71 stops. After stopping the stepping motor 71, the CPU 90 drives the stepping motor 72 through a driver 102, and after a predetermined time the stepping motor 72 stops. Thus the outer and inner reels 30 and 31 are rotated to determine the dividend number. Further, after stopping the stepping motor 72, the CPU 90 actuates the shift motor 37 through a driver 103 to shift the reel assembly 22 from the first position to the second position. Thereby the sensor 46 detects the fragment 48 to generate a shift detect signal, and the shift detect signal is inputted in the CPU 90. When receiving the shift detect signal, the CPU 90 discriminates that the reel assembly 22 is shifting to the first or second position, and stops the shift motor 37 after a predetermined time. While the data signal is not input, the shift motor 37 is continuously driven, and the shift motor 37 continuously rotates even after the passing of the predetermined time, that means something is broken. Therefore, the CPU 90 stops the shift motor 37.

While the reel assembly 22 rotates in the subsidiary games, the sensors 81 and 82 detect the passages of the first and second signal segments 79 and 80 respectively, to generate the reset signal on every turn of each of the outer and inner reel 30, 31. The reset signal is inputted in the CPU 90. Thereby a counter for counting the drive pulse is reset. A data of the arrangement and kinds of the dividend and the number of the drive pulse to each of the symbol are stored in the CPU 90. Accordingly, the CPU 90 can discriminate the dividend pointed in the first and second subsidiary games.

Effects of the slot machine 10 will be described now with reference to FIG. 9-11. Before the slot game is performed, the reel assembly 22 is set to the first position. When the player inserts a coin into the coin slot 18, a coin detection signal is sent from the coin sensor 92 to the CPU 90. Then the player operates the bet button on the operation panel 12, the operation signal is inputted from the operation input detection circuit 94 to the CPU 90, and some judging lines are activated. The CPU 90 actuates the display control IC 93 responding to the operation signal. The display control IC 93 reads out the graphic data from the symbol data memory 95 to display a number of the betted coins (namely the activated judgment lines) in a bet number display window (not shown).

Thereafter, when the player operates the start lever 15, the start signal is inputted into the CPU 90. The CPU 90 actuates the random number generating circuit 96 corresponding to receive of the start signal. In the random number generating circuit 96, the sampling of the random number is carried out and the sampled random number is inputted into the win determining section 97. In the win determining section 97, it is determined whether and in what grade the player wins the slot game.

After determining in the win determining section 97, the display control IC 93 reads out the graphic data of symbol images for each of the symbol display window 17 from the symbol data memory 95 to display the moving of the symbol images on the LCD panel 16. Then the CPU 90 actuates the symbol determining circuit 98. The symbol determining circuit 98 specifies the symbol image to be displayed stationarily in the symbol display window 17, in accordance with the determination in the win determining section 97. After specifying the symbol image to be displayed, the CPU 90 stops the moving of the symbol image through the display control IC 93.

When the predetermined symbols are in alignment on the activated judgment line, the CPU 90 drives the stepping motor 71 through the driver 101. Accordingly, the outer reel 30 is rotated to start the first subsidiary game.

Figure 9A:
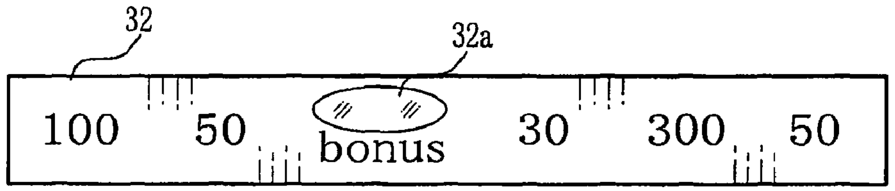
FIG. 9 is an explanatory view of symbols arranged on reel strips wound around first exterior surfaces of the inner and outer reels.

A translucent reel strip 32 shown in FIG. 9A winds around the first exterior surface 30*a* of the outer reel 30. On the reel strip 32, six symbols, "100", "50", "bonus", "30", "300", and "50", are arranged. The numbers express the dividend numbers, and "bonus" is a symbol for execution of the second subsidiary game. A transparent area 32*a* is prepared above "bonus" on the reel strip 32. The symbol displayed on the first exterior surface 31*a* of the inner reel 31 is observable through the transparent area 32*a*. When a predetermined time passes after starting the rotation of the outer reel 30, the outer reel 30 stops. In case one of the numbers is pointed by the pointer 24*d*, the number becomes the dividend number. The CPU 90 stores the dividend number and actuates the display control IC 93 to display the total dividend number in the credit display window.

In case the "bonus" is pointed by the pointer 24*d*, the CPU 90 drives the stepping motor 72 through the driver 102, to rotate the inner reel 31.

Figure 9B:
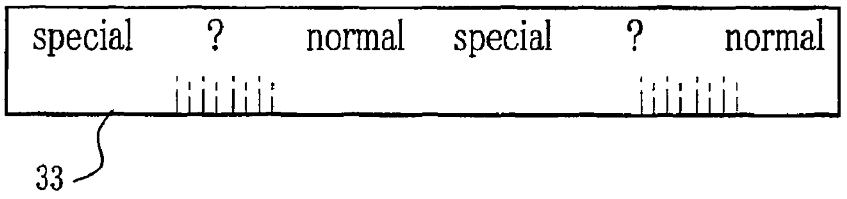
Figure 9C:
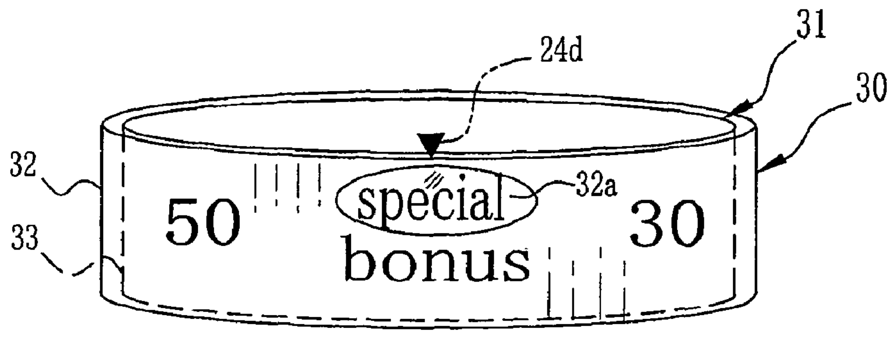

An opaque reel strip 33 shown in FIG. 9B winds around the first exterior surface 31*a* of the inner reel 31. On the reel strip 33, six symbols, "special", "?", "normal", "special", "7", and "normal", are arranged. The "normal" means that a predetermined dividend will be obtained by the player in the second subsidiary game, and the "special" means that a predetermined dividend higher than that of "normal" will be obtained in the second subsidiary game. A dividend of the "7" is unknown at the first subsidiary game. When the inner reel 31 stops in the second subsidiary game, it becomes clear that whether the dividend of "special" or that of "normal" will be obtained. When a predetermined time passes after starting the rotation of the inner reel 31, the inner reel 31 stops. As shown in FIG. 9C, when the inner reel 31 stops, one of the symbols among "special", "?", "normal" is observed through the transparent area 32*a* on the outer reel 30.

After that, the CPU 90 drives the shift motor 37 through the driver 103. When the shift motor 37 is driven, the reel assembly 22 is set to the second position. Thereby the sensor 46 detects the fragment 48, the detection signal is inputted in the CPU 90.

When the reel assembly 22 is set to the second position, the CPU 90 drives the stepping motors 71 and 72 through the drivers 101 and 102 respectively. Accordingly, the outer and inner reels 30, 31 are rotated to start the second subsidiary game.

Figure 10A:
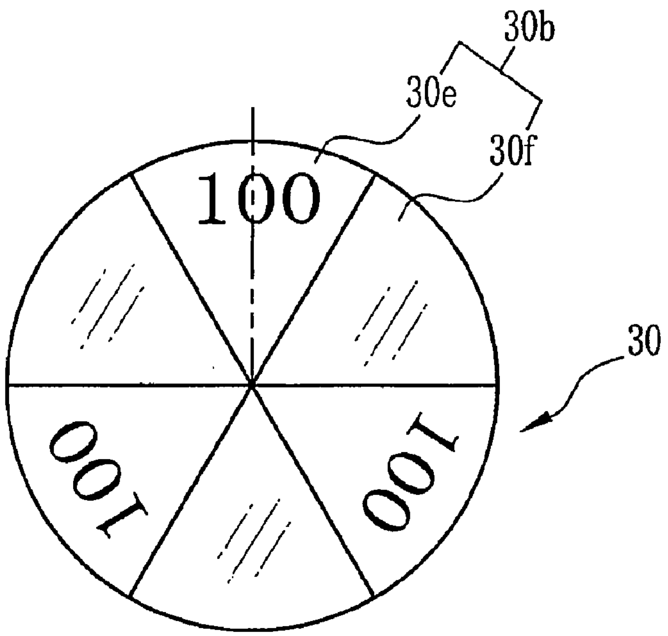
FIG. 10 is an explanatory view of symbols arranged on second exterior surfaces of the inner and outer reels.
Figure 10B:
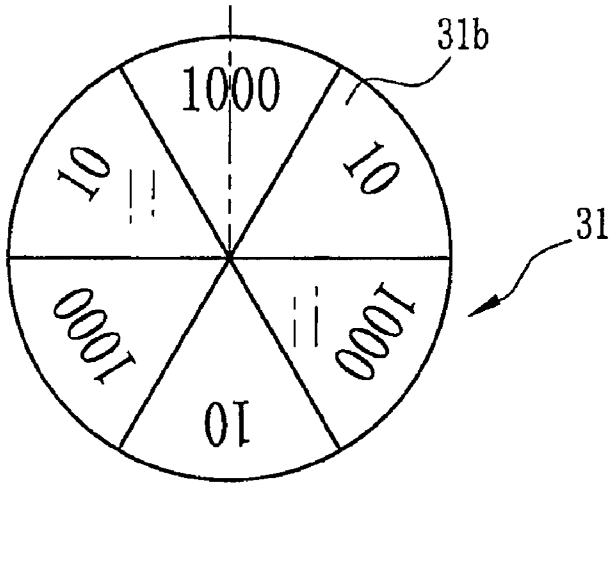

As shown in FIG. 10A, the second exterior surface 30*b* of the outer reel 30 is equally divided into six areas Opaque areas 30*e* and transparent areas 30*f* are arranged by turns for every divided area. Numbers "100" on the opaque areas 30*e* represent the dividend number. The symbol displayed on the second exterior surface 31*b* of the inner reel 31 is observable through the transparent areas 30*f*. Note that in the figure, the reference position corresponding to the position of the first signal segment 79 is shown on one of the opaque areas 30*e* by a double-dashed line. As shown in FIG. 10B, the second exterior surface 31*b* of the inner reel 31 is equally divided into six areas. Numbers "1000" and "10" are arranged by turns for every divided area. Note that in the figure, the reference position corresponding to the position of the second signal segment 80 is shown on one of the divided areas, on which the number "1000" is arranged, by a double-dashed line.

When a predetermined time passes after starting the rotation of the outer reel 30 and the inner reel 31, at first the outer reel 30 stops, and later the inner reel 31 stops.

Figure 11A:
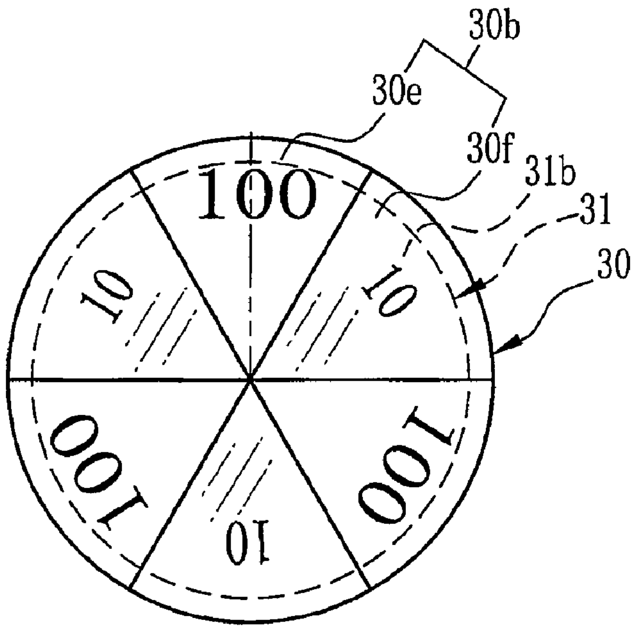
FIG. 11 is an explanatory view of symbols being seen by a player when the second exterior surface of the outer reel is superimposed on the second exterior surface of the inner reel.

In the case of that the "normal" was displayed in the first subsidiary game, as shown in FIG. 11A, the outer reel 30 and the inner reel 31 stop so that their reference positions may overlap. Accordingly, the numbers "10" on the second exterior surface 31*b* of the inner reel 31 is observed through the transparent areas 30*f* of the outer reel 30. The dividend obtained by the player at this time is 330 which is the sum total of all the numbers currently displayed.

Figure 11B:
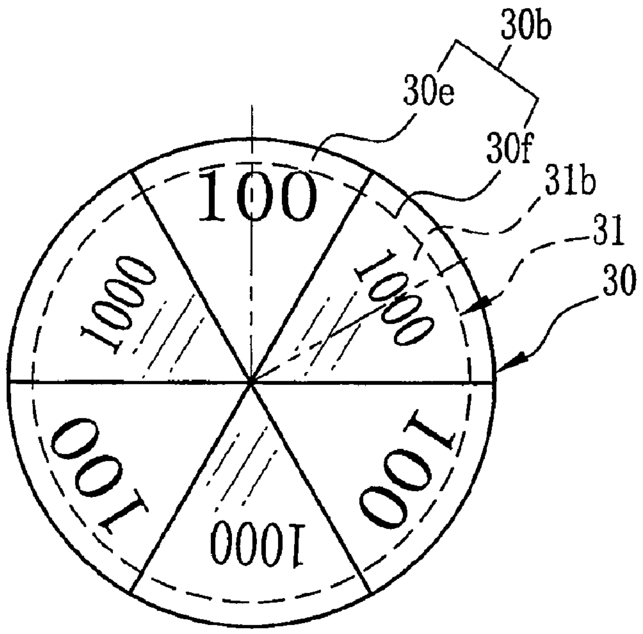
Figure 12:
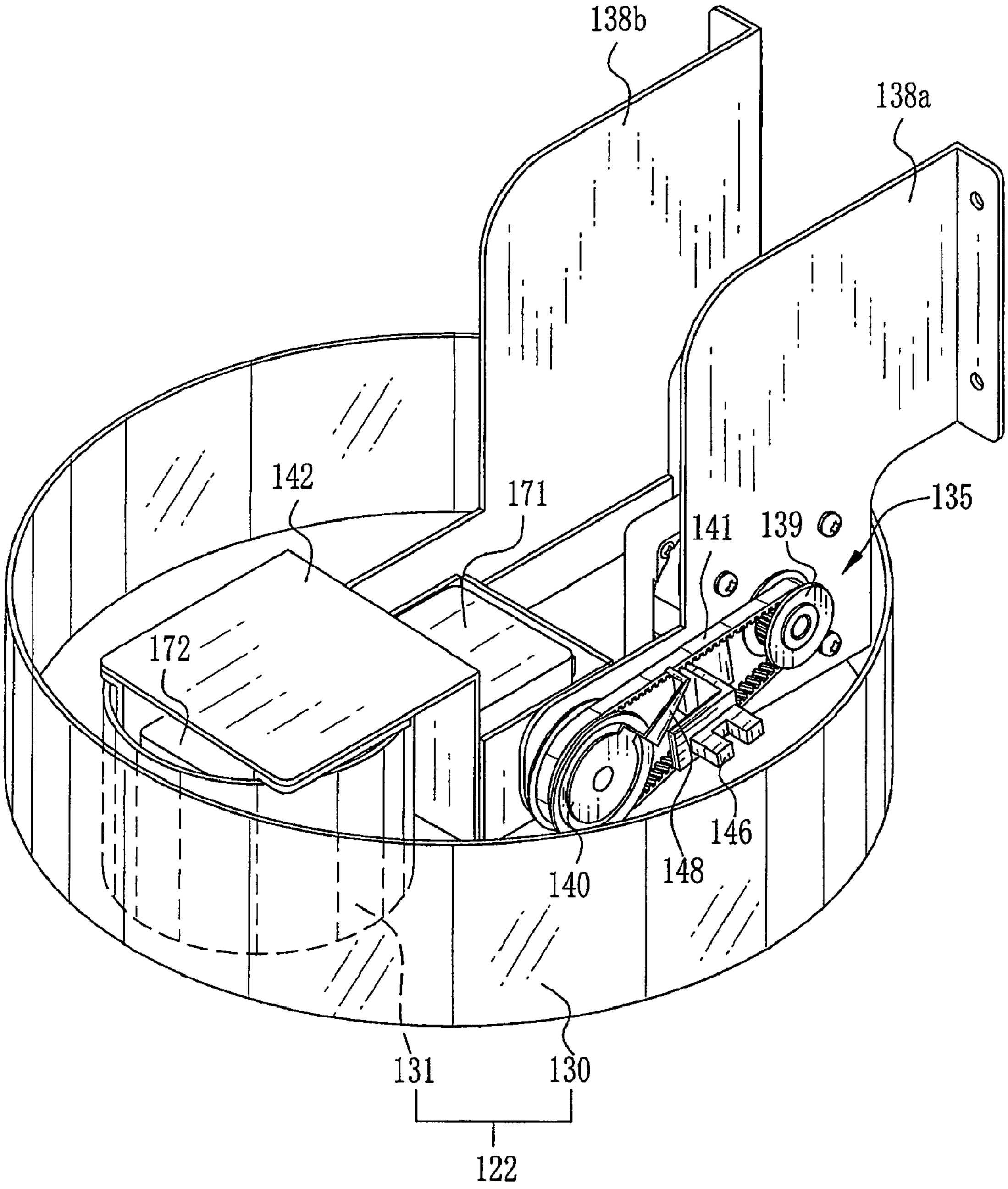
FIG. 12 is a perspective view of a second embodiment of the present invention, which is a symbol display device including a large diameter outer reel and a small diameter inner reel, wherein the reels are set to a first position.
Figure 13:
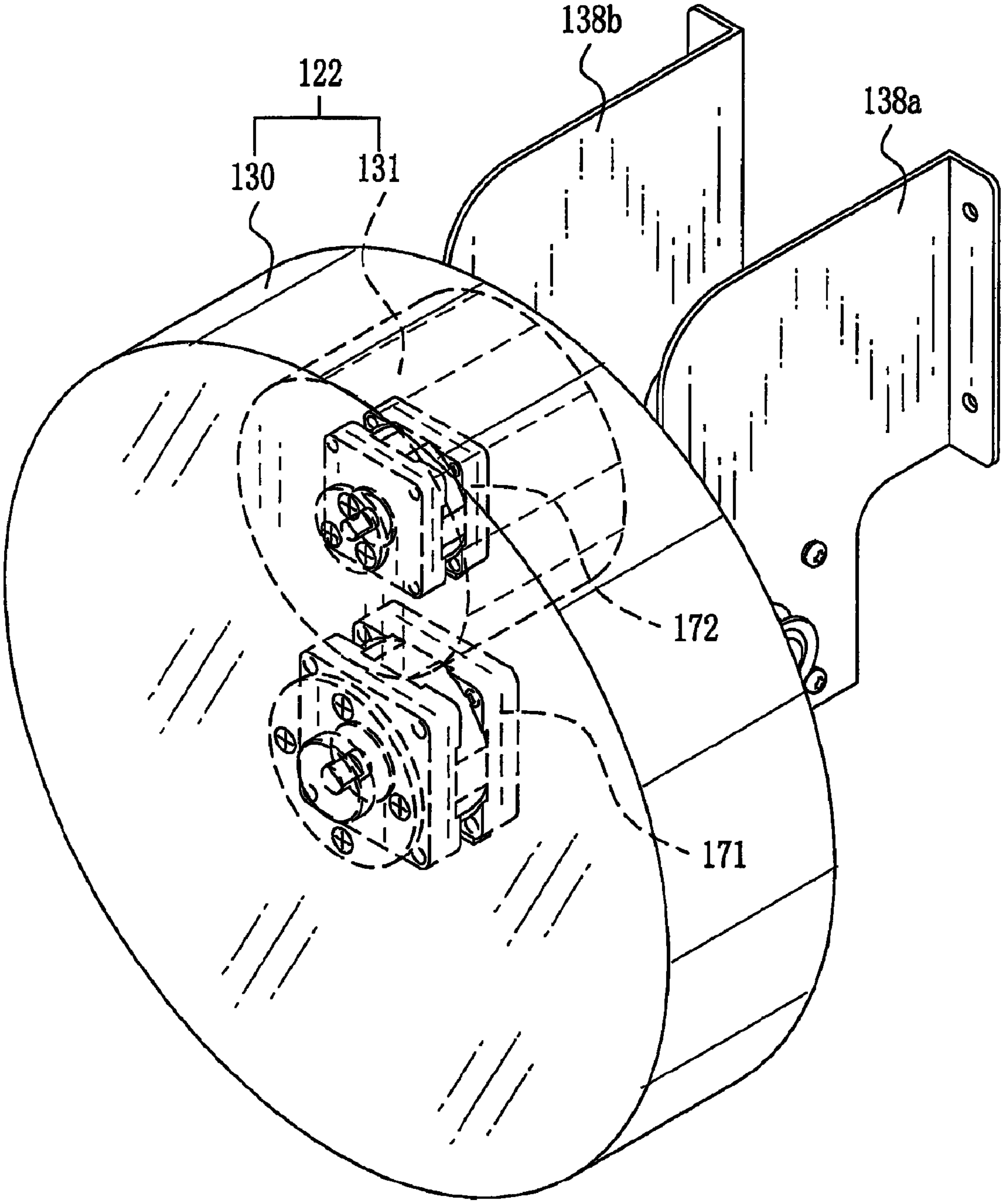
FIG. 13 is a figure similar to FIG. 12, wherein the reels are set to a second position.

In the case of that the "special" was displayed in the first subsidiary game, as shown in FIG. 11B, the outer reel 30 and the inner reel 31 stop so that their reference positions may shift 60 degrees. Accordingly, the numbers "1000" on the second exterior surface 31*b* of the inner reel 31 is observed through the transparent areas 30*f* of the outer reel 30. The dividend obtained by the player at this time is 3300 which is the sum total of all the numbers currently displayed.

In the case of that the "?" was displayed in the first subsidiary game, the inner reel 31 stops in whether the state shown in FIG. 11A or the state shown in FIG. 11B. Accordingly, before the inner reel 31 stopped, the player cannot know which of the dividends 330 or 3300 to be obtained.

In the first embodiment described above, a pointer is not formed on the second display surface 24*b* of the reel cover 24. However, a pointer may be formed on the second display surface 24*b*, and the symbol pointed by the pointer may represent the dividend obtained by the player. In addition, although the pointer 24*d* shown in FIG. 9C is shown for convenience for explanation, in fact they are formed in the first display surface 24*a* of the reel cover 24 (refer to FIG. 3). Moreover, the reference positions shown in FIGS. 10 and 11 are virtual lines, and the lines are not necessarily actually drawn on the reels.

The symbol display device of the present invention may consist of an outer reel having large diameter, and an inner reel having small diameter. In this embodiment, as described in FIG. 12-15, a reel assembly 122 consists of an outer reel 130 and an inner reel 131. The outer reel 130 is formed of a transparent resin, and the inner reel 131 is formed of a translucent resin. Note that about the outer reel 130, that what is necessary is to constitute the outer reel 130 so that the symbols on the inner reel 131 may be observed through the outer reel 130. Therefore, for example the outer reel 130 may be formed by opaque or translucent resin, and a transparent portion, through which the symbols on the inner reel 131 is observed, may be prepared on some parts of the outer reel 130.

A shaft (not shown) provided on an unit support plate 142, to be attached to a large pulley 140 of a reel shift drive section 135, is attached to a fragment 148 also. A sensor (photo interrupter) 146 for detecting the fragment 148 is attached to a right bracket 138*a* with screws (not shown). When a shift motor 137 drives, the unit support plate 142 and the fragment 148 swing in directions C and D (see FIGS. 14 and 15) through a small pulley 139, a toothed belt 141, and the large pulley 140.

Figure 14:
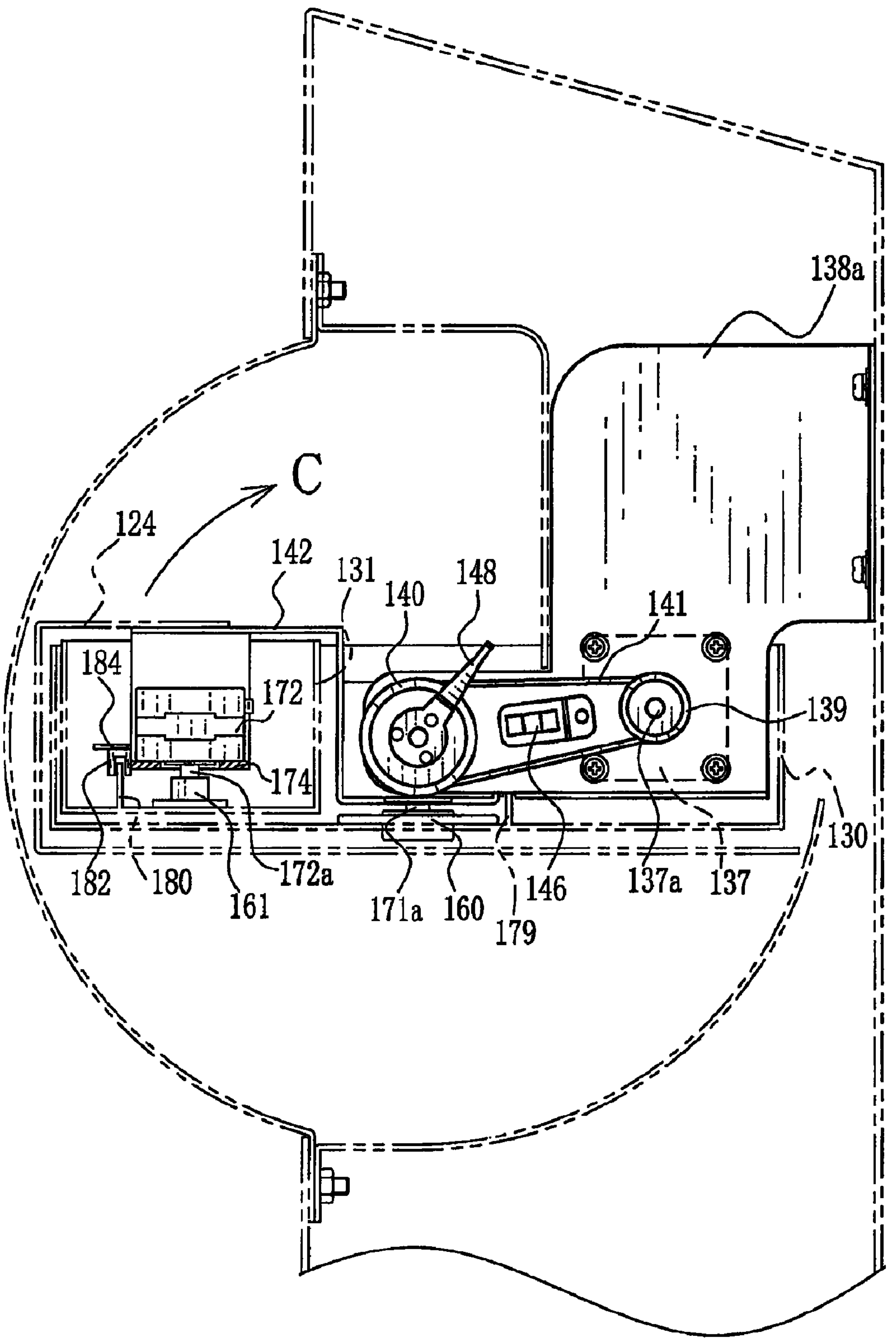
FIG. 14 is a side view of a bracket of the second embodiment, wherein the reels are set to the first position.
Figure 15:
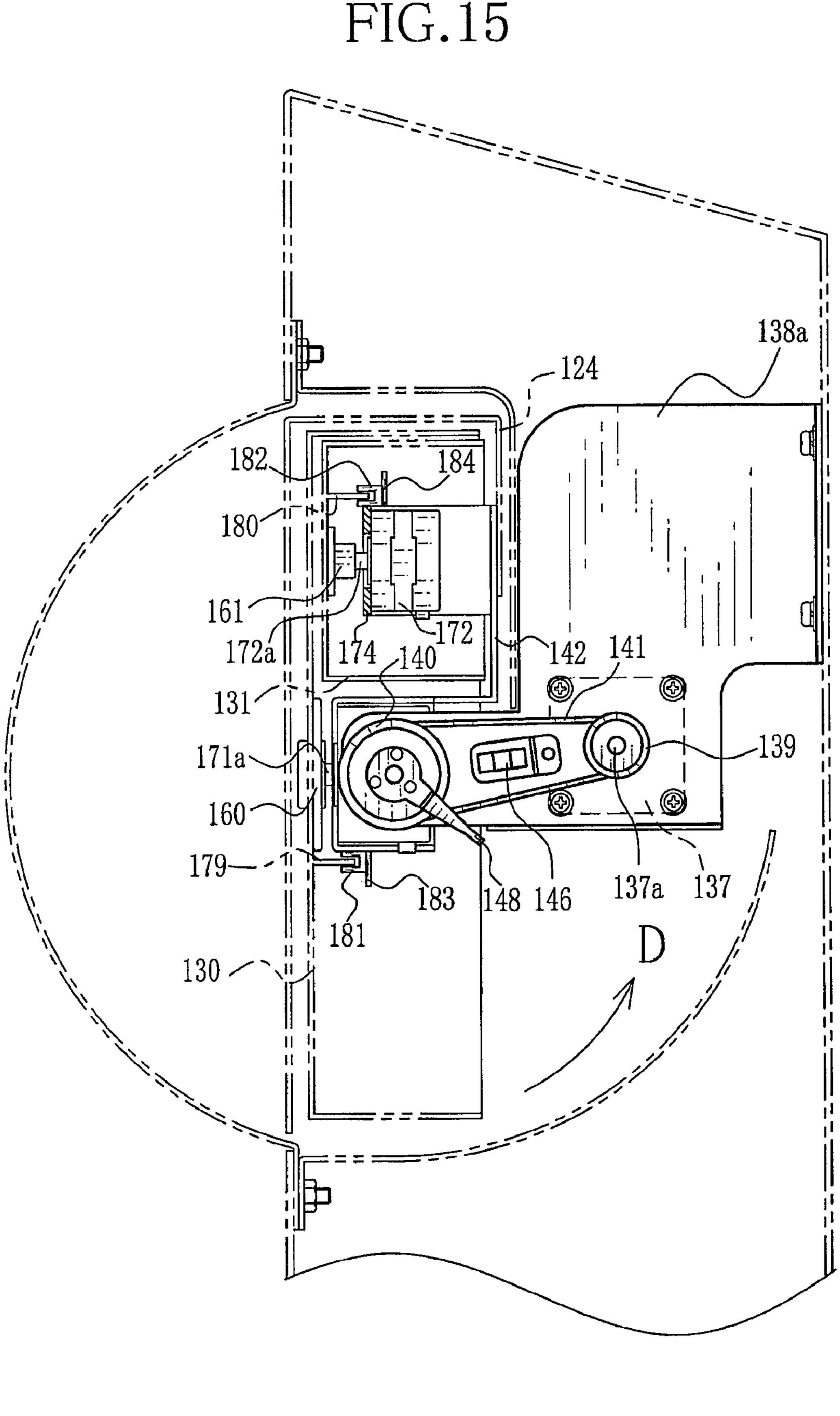
FIG. 15 is a figure similar to FIG. 14, wherein the reels are set to the second position.

In accordance with the rotation of the unit support plate 142, the reel assembly 122 and a reel cover 124 that are fixed to the unit support plate 142 shift between a first position shown in FIG. 14 and a second position shown in FIG. 15. When the reel assembly 122 shifts between the first position and the second position, the fragment 148 rotates to be detected by the sensor 146.

A stepping motor 171 to rotate the outer reel 130 is directly fixed to the unit support plate 142. A first signal segment 179 for indicating a reference position is attached to the outer reel 130, and its rotation is observed by an outer reel rotation detecting sensor 181. On every turn of the outer reel 130, the outer reel rotation detecting sensor 181 outputs a reset signal. Note that the outer reel rotation detecting sensor 181 is fixed to a retaining member 183, which is fixed to the unit support plate 142.

A stepping motor 172 to rotate the inner reel 131 is fixed to a motor mounting bracket 174. The bracket 174 is fixed to the unit support plate 142 with screws (not shown). A second signal segment 180 for indicating a reference position is attached to the inner reel 131, and its rotation is observed by an inner reel rotation detecting sensor 182. On every turn of the inner reel 130, the inner reel rotation detecting sensor 182 outputs a reset signal. Note that the inner reel rotation detecting sensor 182 is fixed to a retaining member 184, which is fixed to the motor mounting bracket 174.

In the above-mentioned second embodiment, first and second subsidiary games are basically performed by the same procedure as the subsidiary games of the first embodiment. However, the outer reel 130 is superimposed on the inner reel 131 only partially. Accordingly, a pointer will be formed on the second display surface (not shown) of the reel cover 124, and the symbol pointed by the pointer will represent the dividend obtained by the player.

In the above embodiments, the symbol display device of the present invention is applied to the slot machine. However, the present invention is not limited to the slot machine, and can be applied to various kinds of game machines, such as a pinball game machine, a bingo game machine, and a pachinko machine.

In the above embodiments, the present invention is applied to the symbol display device for the subsidiary games. However, the present invention can be used as an independent game machine.

Moreover, the symbol display device of the present invention may be used for games other than the dividend determining game. In this case, suitable symbols according to the game are arranged on the first and second exterior surfaces of the outer reel and the inner reel.

Although two display members are performing two kinds of games related mutually in the above embodiments, they may be made to perform two kinds of unrelated games mutually.

In the above embodiments, the games are performed by using both of the outer and inner reels in both of the first and second display positions. However, the usage of the reels is not limited above. For example, one game may be performed by using both of the outer and inner reels in the first display position and another game may be performed by using only the outer reel in the second display position.

In the above embodiments, although the liquid crystal panel is used for the first symbol display device used in the main game, a symbol display device of a mechanical type, in which reels actually rotates, can be used. In addition, in the above embodiments, the subsidiary game is started when the predetermined combination of the symbol is completed at the main game. However, condition to start the subsidiary game may be determined optionally, for example the subsidiary game may be started when one or more predetermined symbols are displayed at the main game.

In the above embodiments, driving force from the shift motor is transmitted to the unit support plate through the pulleys and the belt. However, the drive shaft of the shift motor may be connected to the shaft of the unit support plate, or interlocked to the shaft through the link mechanism or gear mechanism. Further, instead of the toothed belt, a V-shaped belt or a chain may also be used, and further an adequate type of motor may be used as the shift motor, instead of the stepping motor As described above, the method of transmitting the driving force of the motor is not limited to the above embodiments. In addition, the method of attaching the reel, the method and the mechanism of holding the driving shaft, and the mechanism of the reel rotation drive section are not limited to the above embodiments.

In the above embodiments, the first exterior surfaces are displayed at the time of beginning the game, and the second exterior surfaces are displayed only if the predetermined conditions are fulfilled at the game. However, about how to use the display member, that can be changed according to contents of a game.

In the above embodiments, the first subsidiary game is performed first in the first display position and the second subsidiary game is performed thereafter in the second display position. However, the first and second subsidiary games do not mean the order of performing the subsidiary games, and an order of performing the subsidiary game can be set up arbitrarily.

In the above embodiments, the outer reel is rotated and stopped first in the first subsidiary game, and the inner reel is rotated and stopped only if the symbol "bonus" is displayed. However, the condition, order, timing, speed, direction, etc. for rotating the outer and inner reels are not limited to the embodiments. The same is said in the second subsidiary game.

The symbol in the present invention contains all of a sign, a mark, a number, a pattern, a character, and other similar things. And how to arrange the symbols in each display member, and a kind, form, color, number, etc. of the symbols are not limited to the embodiments. Moreover, dividends can also be set up arbitrarily.

In the above embodiments, the translucent reel strip winds around the first exterior surface of the outer reel, and the transparent area is prepared partially on the reel strip such that the symbol displayed on the first exterior surface of the inner reel is observable through the transparent area. However, instead of that, a transparent reel strip with printing may be used. Moreover, arrangements of the transparent areas on the first and second exterior surfaces can be suitably changed according to contents of a game.

In the above embodiments, at least the part of the outer reel is formed by transparent resin, and the inner reel is formed by translucent resin. However, the materials for forming the reels are not limited to the embodiments.

Besides the above mentioned examples, it can determine suitably about how to use the symbol display device of the present invention according to contents of a game, or contents being displayed.

Although the present invention has been described with reference to the preferred embodiments, the present invention should not be limited by the embodiments. Various changes and modifications are possible in the present invention and may be understood to be within the scope of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one display device including:
- (a) a plurality of concentrically arranged reels, a first one of the reels having a first side and a second side positioned adjacent to the first side,
- (b) a first set of symbols in association with the first side of the first reel, the first set of symbols including a designated first symbol having a designated viewable area, and
- (c) a second set of symbols in association with the second side of the first reel;

at least one input device;

at least one processor; and at least one memory device storing a plurality of instructions, which when executed by the at least one processor, cause the at least one processor to operate with the at least one display device and the at least one input device to:
- (a) display the first side of the first reel,
- (b) cause a rotation of the first reel,
- (c) display at least one of the symbols from the first set of symbols,
- (d) provide an award, if any, based at least in part on the at least one displayed symbol from the first set of symbols, and
- (e) if the designated symbol from the first set of symbols is displayed:
  - (i) display the second side of the first reel,
  - (ii) cause a rotation of the first reel,
  - (iii) display at least one of the symbols from the second set of symbols, and
  - (iv) provide an award, if any, based at least in part on the at least one displayed symbol from the second set of symbols.

2. The gaming device of claim 1, wherein the first, reel is an outer reel.

3. The gaming device of claim 1, wherein the first side of the first reel is viewable from a front perspective of the first reel, and the second side of the first reel is viewable from a side perspective of the first reel.

4. The gaming device of claim 1, wherein the first side of the first reel is positioned transverse to the second side of the first reel.

5. The gaming device of claim 1, wherein the first side of the first reel includes at least one first symbol display area configured to display at least one symbol of the first set of symbols, and the second side of the first reel includes at least one second symbol display area configured to display at least one symbol of the second set of symbols.

6. The gaming device of claim 1, wherein a second one of the concentrically arranged reels includes: (a) a first side associated with the first set of symbols, and (b) a second side positioned adjacent to the first side, said second side being associated with the second set of symbols, wherein if the designated symbol from the first set of symbols is displayed, the plurality of instructions, when executed by the at least one processor, cause the at least one processor to:
- (i) display the second side of the second reel,
- (ii) cause a rotation of the second reel,
- (iii) display at least one of the symbols symbol from the second set of symbols, and
- (iv) provide the award, if any, based at least in part on the at least one displayed symbol from the second set of symbols.

7. The gaming device of claim 6, wherein the plurality of instructions, when executed by the at least one processor, cause the at least one processor to display the at least one symbol from the second set of symbols on the second side of the second reel.

8. The gaming device of claim 1, wherein the first set of symbols includes at least one different symbol, said different symbol being different from each of the symbols of the second set of symbols.

9. A gaming device comprising:

at least one display device including a concentric reel set, the concentric reel set having:
- (a) a first reel defining a first side and defining a second side positioned adjacent to said first side, said first reel having a plurality of first symbol areas including a designated first symbol area which includes a designated symbol and a designated viewable area, and
- (b) a second reel concentrically arranged with the first reel, the second reel defining a first side and defining a second side positioned adjacent to said first side, said second reel having a plurality of second symbols, the first reel being positionable relative to the second reel to enable a player to view one of the second symbols on the second reel through the viewable area of the designated first symbol area;

at least one input device;

at least one processor; and at least one memory device which stores a plurality of instructions, which when executed by the at least one processor, cause the at least one processor to operate with the at least one display device and the at least one input device to:
- (a) cause the first side of the first reel to display at least one of the plurality of first symbol areas; and
- (b) if the designated first symbol area is displayed:
  - (i) cause the first side of the second reel to display at least one of the plurality of second symbols,
  - (ii) cause at least one of: (x) the second side of the first reel, and (y) the second side of the second reel to display at least one third symbol from a plurality of third symbols, at least one of the plurality of third symbols being based on the displayed at least one second symbol, and
  - (iii) provide an award to the player, said award being based at least in part on the displayed at least one third symbol.

10. The gaming device of claim 9, wherein each of the plurality of third symbols is associated with a value amount, and if the displayed at least one second symbol is a first predetermined one of the second symbols, a sum of the value amounts associated with each displayed third symbol is different from a sum of the value amounts associated with each displayed third symbol if the displayed at least one second symbol is a second predetermined one of the second symbols.

11. The gaming device of claim 9, wherein the plurality of instructions, when executed by the at least one processor, cause the at least one processor to position the concentric reel set to enable the player to view one of the first side of the first reel and the second side of the second reel, and rotate the concentric reel set to enable the player to view one of the second side of the first reel and the second side of the second reel.

12. The gaming device of claim 9, wherein at least one of: (a) the second side of the first reel, and (b) the second side of the second reel has a circular shape.

13. The gaming device of claim 9, wherein the plurality of instructions, when executed by the at least one processor, cause the at least one processor to provide a first symbol award, if any, associated with the displayed at least one first symbol area.

14. The gaming device of claim 9, wherein the plurality of instructions, when executed by the at least one processor, cause the at least one processor to provide a second symbol award, if any, associated with the displayed at least one second symbol.

15. A gaming device comprising:

at least one display device including a concentric cylindrical body set, the concentric cylindrical body set having:

(a) a first cylindrical body having a first side and a second side positioned adjacent to said first side, said first cylindrical body having a plurality of first symbol areas including a designated first symbol area which includes a designated symbol and a designated viewable area, and (b) a second cylindrical body concentrically arranged with the first cylindrical body, the second cylindrical body having a first side and a second side positioned adjacent to said first side, said second cylindrical body having a plurality of second symbols, the first cylindrical body being positionable relative to the second cylindrical body to enable a player to view one of the second symbols on the second cylindrical body through the viewable area of the designated first symbol area;

at least one input device;

at least one processor; and at least one memory device which stores a plurality of instructions, which when executed by the at least one processor, cause the at least one processor to operate with the at least one display device and the at least one input device to:

(a) cause the first side of the first cylindrical body to display at least one of the plurality of first symbol areas; and (b) if the designated first symbol area is displayed:

(i) cause the first side of the second cylindrical body to display at least one of the plurality of second symbols, (ii) cause at least one of: (x) the second side of the first cylindrical body, and (y) the second side of the second cylindrical body to display at least one third symbol from a plurality of third symbols, at least one of the plurality of third symbols being based on the displayed at least one second symbol, and (iii) provide an award to the player, said award being based at least in part on the displayed at least one third symbol.

16. The gaming device of claim 15, wherein each of the plurality of third symbols is associated with a value amount, and if the at displayed at least one second symbol is a first predetermined one of the second symbols, a sum of the value amounts associated with each displayed third symbol is different from a sum of the value amounts associated with each displayed third symbol if the displayed second symbol is a second predetermined one of the second symbols.

17. The gaming device of claim 15, wherein the plurality of instructions, when executed by the at least one processor, cause the at least one processor to position the concentric cylindrical body set to enable the player to view one of the first side of the first cylindrical body and the second side of the second cylindrical body, and rotate the concentric cylindrical body set to enable the player to view one of the second side of the first cylindrical body and the second side of the second cylindrical body.

18. The gaming device of claim 15, wherein at least one of: (a) the second side of the first cylindrical body, and (b) the second side of the second cylindrical body is cylindrically-shaped.

19. The gaming device of claim 15, wherein the plurality of instructions, when executed by the at least one processor, cause the at least one processor to provide a first symbol award, if any, associated with the displayed at least one first symbol area.

20. The gaming device of claim 15, wherein the plurality of instructions, when executed by the at least one processor, cause the at least one processor to provide a second symbol award, if any, associated with the displayed at least one second symbol.

21. A method for operating a gaming device, said method comprising:

(a) causing at least one processor to execute a plurality of instructions stored in at least one memory device to operate with at least one display device to display a game including a plurality of concentrically arranged reels, a first one of said reels including a first side and a second side positioned adjacent to the first side, causing the at least one processor to execute the plurality of instructions to operate with the at least one display device to display the first side of the reel being viewable from a front perspective of the first reel, and the second side of the first reel being viewable from a side perspective of the first reel;

(b) causing the at least one processor to execute the plurality of instructions to operate with the at least one display device to display a first symbol from a set of symbols in association with the first side of the first reel;

(c) if the displayed first symbol is a designated first symbol, causing the at least one processor to execute the plurality of instructions to operate with the at least one display device to display a second set of symbols in association with the second side of the first reel; and (d) providing an award, if any, based at least in part on at least one of: (i) the displayed first symbol, and (ii) at least one second symbol from the second set of symbols.

22. The method of claim 21, which includes causing the at least one processor to execute the plurality of instructions to operate with the at least one display device to display a plurality of reels, said plurality of reels including the concentric reels and at least one other reel.

23. The method of claim 21, which includes causing the at least one processor to execute the plurality of instructions to operate with the at least one display device to display a first side of each of a plurality of the plurality of concentrically arranged reels, each displayed first side being associated with the first set of symbols, and display a second side of each of a plurality of the plurality of concentrically arranged reels, each displayed second side being associated with the second set of symbols.

24. The method of claim 21, which is controlled through a data network.

25. The gaming device of claim 9, wherein at least one of: (a) the first side of the first reel, and (b) the first side of the second reel has a circular shape.

26. The gaming device of claim 9, wherein at least one of: (a) the second side of the first reel, and (b) the second side of the second reel is cylindrically-shaped.

27. The gaming device of claim 9, wherein at least one of: (a) the first side of the first reel, and (b) the first side of the second reel is cylindrically-shaped.

28. The gaming device of claim 15, wherein at least one of: (a) the first side of the first cylindrical body, and (b) the first side of the second cylindrical body is cylindrically-shaped.

29. The gaming device of claim 15, wherein at least one of: (a) the second side of the first cylindrical body, and (b) the second side of the second cylindrical body has a circular shape.

30. The gaming device of claim 15, wherein at least one of: (a) the first side of the first cylindrical body, and (b) the first side of the second cylindrical body has a circular shape.

* * * * *

UNITED STATES PATENT AND TRADEMARK OFFICE

CERTIFICATE OF CORRECTION

PATENT NO. : 8,092,296 B2
APPLICATION NO. : 12/118139
DATED : January 10, 2012
INVENTOR(S) : Haruo Inoue It is certified that error appears in the above-identified patent and that said Letters Patent is hereby corrected as shown below:

IN THE CLAIMS:

In Claim 1, column 13, line 38, after “designated” add --first--.

In Claim 2, column 13, line 47, after “first” delete “,”.

In Claim 6, column 14, line 5, delete “symbol”.

In Claim 9, column 14, line 33, before “viewable” add --designated--.

In Claim 15, column 15, line 36, before “viewable” add --designated--.

In Claim 21, column 16, line 46, before “set” add --first--.

In Claim 22, column 16, lines 60-61, replace “concentric” with --concentrically arranged--.

In Claim 23, column 16, line 67, after “each of” replace “a” with --the--.

Signed and Sealed this
Tenth Day of April, 2012

David J. Kappos
*Director of the United States Patent and Trademark Office*